United States Patent
Muncy et al.

(10) Patent No.: US 11,202,030 B2
(45) Date of Patent: Dec. 14, 2021

(54) SYSTEM AND METHOD FOR PROVIDING COMPLETE EVENT DATA FROM CROSS-REFERENCED DATA MEMORIES

(71) Applicant: Bendix Commercial Vehicle Systems LLC, Elyria, OH (US)

(72) Inventors: Mark A. Muncy, Rancho Santa Margarita, CA (US); Andreas U. Kuehnle, Villa Park, CA (US); Brendan E. Buzer, Laguna Beach, CA (US); Hans M. Molin, Mission Viejo, CA (US)

(73) Assignee: Bendix Commercial Vehicle Systems LLC, Elyria, OH (US)

( * ) Notice: Subject to any disclaimer, the term of this patent is extended or adjusted under 35 U.S.C. 154(b) by 100 days.

(21) Appl. No.: 16/208,375

(22) Filed: Dec. 3, 2018

(65) Prior Publication Data
US 2020/0177835 A1 Jun. 4, 2020

(51) Int. Cl.
*H04N 5/77* (2006.01)
*G11B 27/34* (2006.01)
*H04N 7/18* (2006.01)

(52) U.S. Cl.
CPC ............ *H04N 5/77* (2013.01); *G11B 27/34* (2013.01); *H04N 7/188* (2013.01)

(58) Field of Classification Search
None
See application file for complete search history.

(56) References Cited

U.S. PATENT DOCUMENTS

| 5,862,342 | A | 1/1999 | Winter et al. |
|---|---|---|---|
| 8,306,967 | B2 | 11/2012 | Galitsky et al. |
| 2004/0128317 | A1 | 7/2004 | Sull et al. |
| 2006/0064716 | A1 | 3/2006 | Sull et al. |
| 2007/0219686 | A1* | 9/2007 | Plante ............... H04N 5/23229 701/33.4 |
| 2008/0316314 | A1* | 12/2008 | Bedell .................... H04N 7/185 348/148 |

(Continued)

FOREIGN PATENT DOCUMENTS

| JP | 2006-80947 A | 3/2006 |
|---|---|---|
| KR | 10-1487173 B1 | 1/2015 |

OTHER PUBLICATIONS

Mexican-language Mexican Office Action issued in Mexican application No. MX/a/2019/014161 dated Jul. 23, 2020 (Two (2) pages).

*Primary Examiner* — Heather R Jones
(74) *Attorney, Agent, or Firm* — Crowell & Moring LLP

(57) ABSTRACT

A method for providing event data from cross-referenced data memories of an on-vehicle event detection and reporting system includes cross-referencing event data stored in an event buffer with continuous video data stored in a continuous DVR memory. A request for additional data corresponding to a detected driving or vehicle event may be received by the on-vehicle system, where the request includes an event identifier corresponding to a detected driving or vehicle event. The requested additional data is identified in the DVR memory using the event identifier and based on said cross-referencing between the event data with the continuous video data stored in the DVR memory. The identified additional data is then transmitted from the DVR memory for display on a user computer.

30 Claims, 6 Drawing Sheets

(56) References Cited

U.S. PATENT DOCUMENTS

2014/0300739 A1\* 10/2014 Mimar ................... G08B 21/06
                                                              348/148
2016/0042767 A1\* 2/2016 Araya .................... H04N 7/188
                                                              386/201
2017/0309307 A1   10/2017 Park
2020/0059626 A1\* 2/2020 Champa .............. G06F 16/7867

\* cited by examiner

SYSTEM AND METHOD FOR PROVIDING COMPLETE EVENT DATA FROM CROSS-REFERENCED DATA MEMORIES

FIELD OF THE INVENTION

The invention relates to providing complete event data and, in particular, to providing prequel and sequel event data, based on user preference and/or event type, from multiple cross-referenced data memories.

BACKGROUND

Current methods of capturing driving and vehicle event data relating to a detected event are based on creating an event dataset that begins some predefined small amount of time (e.g., 5-10 seconds) before the detected event and finishes some corresponding small amount of time (e.g., 5-10 seconds) following the detected event. This generated dataset essentially spans a predefined window centered on a point in time at which the detected event occurred, and is stored in a circular buffer memory.

However, such methods of capturing driving and vehicle event data fail to take into account potentially important information which might not happen to fall within the predefined window from which the event dataset is created. For example, perhaps a driver has been fighting strong crosswinds for a long period of time prior to an excessive lane departure, and oversteers as a result. Perhaps a driver slowed down for a long time after an event because she lost her composure, thus reducing throughput, or perhaps she did not stop to investigate potential vehicle damage (though she should have), thus reducing safety. Current solutions do not provide a means by which to identify and access data from such additional periods of time. Moreover, simply enlarging the data capture window is also not an optimal solution due to the limited size of the buffer memory and the additional overhead for processing larger datasets that may not be needed or desired.

As such, there is a need in the art for a system and method that overcomes the aforementioned drawbacks.

SUMMARY OF THE INVENTION

In one embodiment of the invention, an on-vehicle event detection and reporting system includes a camera, an event buffer, a continuous digital video recorder (DVR) memory, a clock circuit, a wireless transceiver, and a processor, coupled to the camera, event buffer, DVR memory, clock circuit and wireless transceiver. The processor is configured to store continuous video data in the DVR memory, and to separately store event data in the event buffer in response to detecting a driving or vehicle event, where the event data comprises a video data corresponding to a point in time when the driving or vehicle event occurred.

The processor is further configured to cross-reference the event data with the continuous video data stored in the DVR memory, and to transmit, via the wireless transceiver to a remote server, the event data stored in the event buffer in response to detecting the driving or vehicle event, where at least a portion of the event data is configured to be displayed on a user computer. The process also receives, from the remote server via the wireless transceiver, a request for additional data corresponding to the detected driving or vehicle event, where the request includes an event identifier corresponding to the detected driving or vehicle event.

The processor of the on-vehicle event detection and reporting system is also configured to identify the additional data (contemporaneous or coeval) in the DVR memory using the event identifier and the cross-reference between the event data with the continuous video data stored in the DVR memory, and to transmit, via the transceiver to the remote server, the identified additional video data from the DVR memory, where the additional data is configured to be displayed on the user computer.

The invention further includes a method carried out by the processor of the on-vehicle event detection and reporting system.

Other objects, advantages and novel features of the present invention will become apparent from the following detailed description of one or more preferred embodiments when considered in conjunction with the accompanying drawings.

DESCRIPTION OF EXEMPLARY EMBODIMENTS OF THE INVENTION

Figure 1:
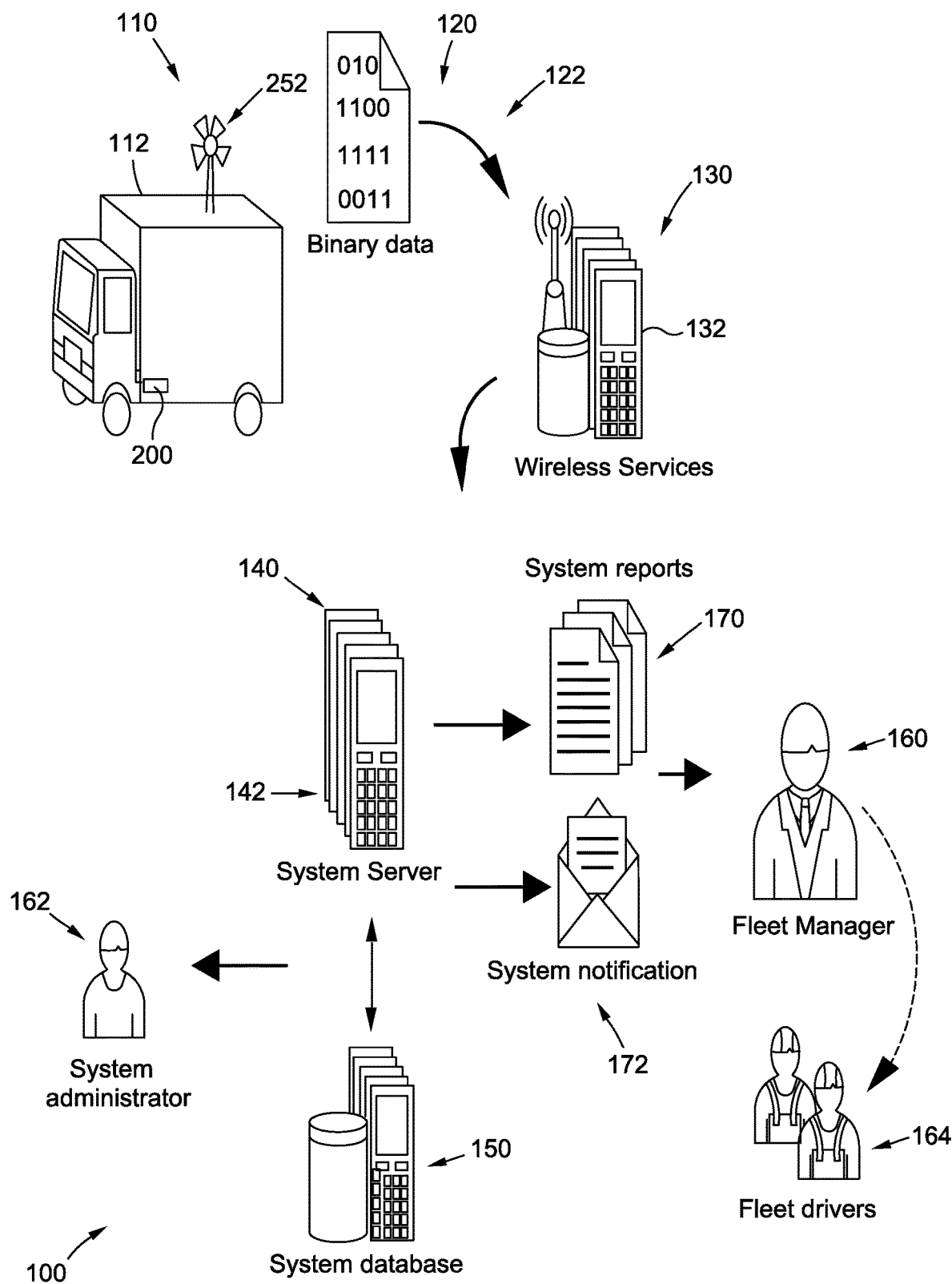
FIG. 1 is a diagram of an overview of a fleet management system configured in accordance with the principles of the invention.

In the following description of the present invention reference is made to the accompanying figures which form a part thereof, and in which is shown, by way of illustration, exemplary embodiments illustrating the principles of the present invention and how it is practiced. Other embodiments can be utilized to practice the present invention and structural and functional changes can be made thereto without departing from the scope of the present invention In certain embodiments, an on-vehicle event detection and reporting system may include one or more forward facing cameras that are configured such that the field of view of the camera(s) captures the scene ahead of the vehicle from, for example, the perspective of a driver of the vehicle. Also, one or more driver facing cameras may be used to capture a view of the driver of the vehicle, and/or a view of other areas of the cabin, as the driver controls the vehicle while driving. Still other embodiments may include cameras configured to capture other scenes relative to the vehicle. For instance, embodiments may include cameras configured to capture the scene behind the vehicle, to either side of the vehicle, etc.

The event detection and reporting system may be further configured to collect and provide non-video data, including non-video event-based data corresponding to a detected driving or vehicle event that occurred at a particular point in time during a driving excursion. Such event-based data can include data collected from components of, or components interacting with, the event detection and reporting system.

These components can detect, in real time, driving or vehicle-related events that happen over the course of a driving excursion. The components can report such events to the event detection and reporting system. Examples of events that may be reported to/collected by the event detection and reporting system in real time include, for example and without limitation, excessive acceleration, excessive braking, exceeding speed limit, excessive curve speed, excessive lane departure, lane change without turn signal, loss of video tracking, LDW system warning, following distance alert, forward collision warning, collision mitigation braking, etc.

Driving and/or vehicle events can also be detected through an analysis of the captured driving video and/or audio. For example, the speed limit of a segment of road can be detected by analyzing the captured vehicle video to identify speed limit signs captured in the video. Upon identifying a speed limit sign, and the speed limit indicated thereon, a speed limit (change) event may be generated. Depending on embodiments, this analysis may be performed by the event detection and reporting system as the driving video is captured. In alternative embodiments, this analysis may be offloaded to remote systems.

In accordance with an embodiment, the event detection and reporting system may use data collected directly from vehicle components (e.g., devices, sensors, or systems), and data collected from an analysis of vehicle video, to generate event datasets that correspond in time with one or more detected driving events. Event data generated for a detected event may be associated with captured video frames whose timeline spans or overlaps the time when the event was detected/collected. Event data generated from an event determined from processing of captured vehicle video may at least be associated with the video from which it was generated, but may also be associated with other captured video frames whose timelines span or overlap the time when the event was detected/collected (in these scenarios, the time may be calculated based on the video frame or frames from which the event object was derived).

The particular invention disclosed and claimed herein relates to a system and method for providing event data from cross-referenced data memories of an on-vehicle event detection and reporting system in which event data stored in an event buffer (e.g., a circular buffer) is cross-referenced with continuous video data stored in a separate, continuous DVR memory. A request for additional data corresponding to a detected driving or vehicle event may be received by the on-vehicle system, where the request includes an event identifier (e.g., time of event, event number, type of event, etc.) corresponding to a detected driving or vehicle event or set of events, these given by a time window, a spatial location, or by event type. The requested additional data is identified in the DVR memory using the event identifier, the desired length of prequel and sequel data, and based on said cross-referencing between the event data with the continuous video data stored in the DVR memory. The identified additional data is then transmitted from the DVR memory for display on a user computer. Additional details are set forth below.

Referring now to the drawings, FIG. 1 illustrates an overview of a fleet management and reporting system 100 in accordance with one embodiment. In the example embodiment of the present invention, vehicles 110, such as trucks and cars, and particularly fleet vehicles 112, are configured with an event detection and reporting system 200 (see FIG. 2) that generates actual data relating to driving and vehicle events that may be of interest to a fleet manager or other user. Such a system 200 may include for example a Lane Departure Warning (LDW) system 222 (FIG. 2) that generates signals indicative of an actual lane departure, such as lane wandering or crossing. Additionally, secondary systems to be described in greater detail below with reference to FIG. 2 carried by the vehicles or installed in the vehicle systems, include one or more video cameras, radar, lidar, transmission, engine, tire pressure monitoring and braking systems for example may generate additional safety event data and driver behavior data. Front facing cameras, radar and lidar-based systems may also be used to provide data relating to driver behavior in the context of following distance, headway time, response to speed signs, and anticipation of needed slowing.

With continued reference to FIG. 1, event data 120 may be selectively sent via communication links 122 to network servers 132 of one or more service providers 130. Communication service providers 130 may utilize servers 132 (only one shown for ease of illustration) that collect data 120 provided by the vehicles 112.

One or more servers 140 of the fleet management and reporting system 100 are configured to selectively download or otherwise retrieve data either directly from the vehicles 112 via the service providers 130 or from collection servers 132 which may be third party servers from one or more various telematics suppliers. Servers 140 are configured to initiate processing of the event data in manners to be described in greater detail below.

A web application 142 executable on the one or more servers 140 of the fleet management and reporting system 100 includes a dynamic graphical user interface for fleet managers 160 and administrators 162 to view all of the information once it is processed. The subject fleet management and reporting system 100 of the example embodiment also includes one or more databases 150 configured to selectively store all event information provided from the vehicles 112 in the fleet 110 for one or more designated time intervals, including raw and post-processed trip data.

Figure 2:
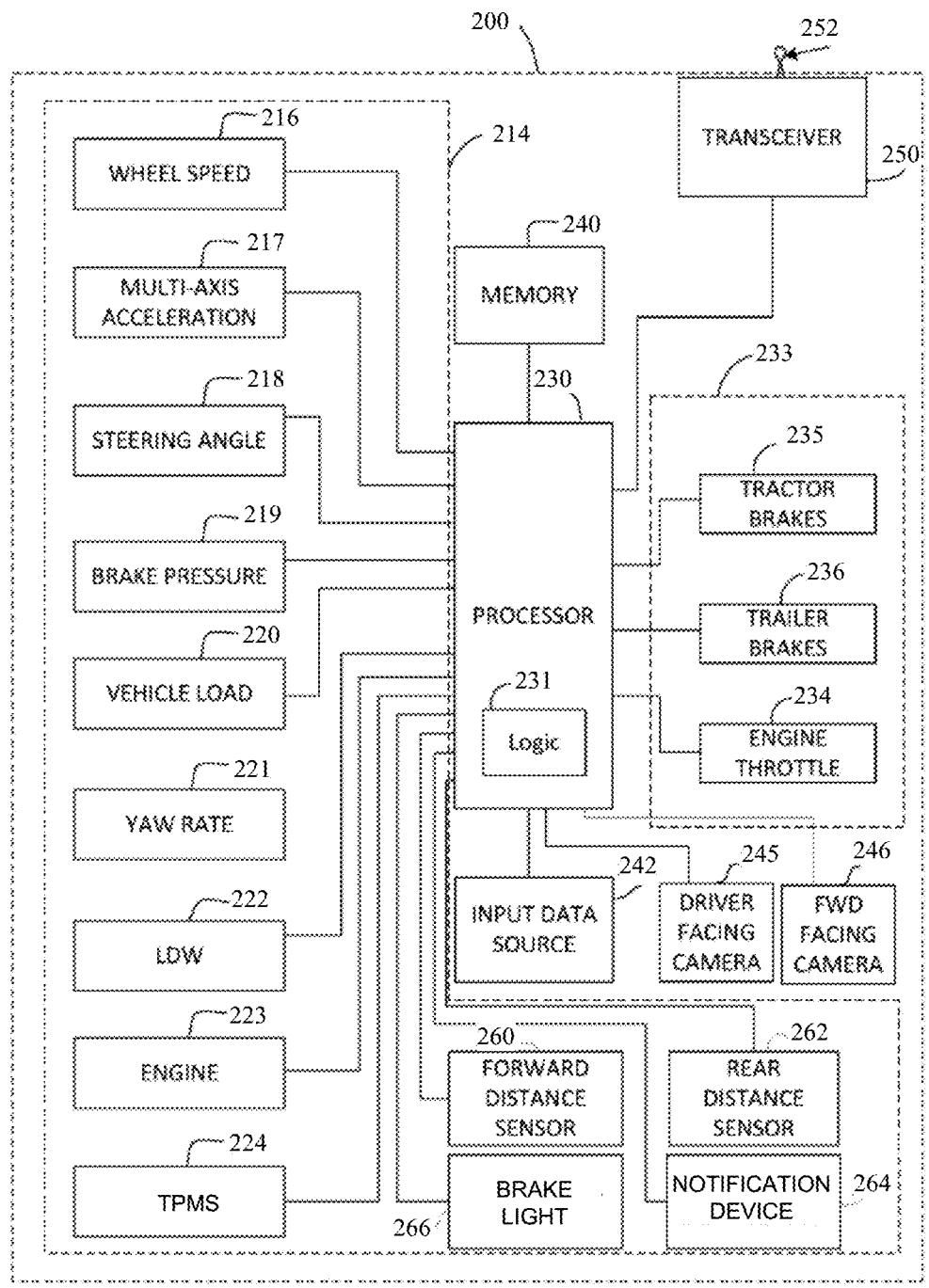
FIG. 2 is a block diagram that illustrates one embodiment of a vehicle-based computer system configured to implement one or more aspects of the invention.

In accordance with the example embodiment, the system administrators 162 are users who are provided with interfaces to configure and manage fleets, monitor platform performance, view alerts issued by the platform, and view driver and event data and subsequent processing logs and/or views. Fleet managers 160 may view event information for their respective fleet for internal processing. These events can arrive via user-initiated reports 170 in the web application 142 executable on the one or more servers 140, or via email or other notifications 172. Fleet managers 160 may, depending on internal policies and processes or for other reasons, also interface with individual drivers 164 regarding performance goals, corrections, reports, or coaching Referring now to FIG. 2, depicted is a schematic block diagram that illustrates details of an event detection and reporting system mentioned above, and which is configured to be used in accordance with one or more exemplary embodiments of the invention. As further detailed below, the in-vehicle event detection and reporting system 200 may be adapted to detect a variety of operational parameters and conditions of the vehicle and the driver's interaction therewith and, based thereon, to determine if a driving or vehicle event has occurred (e.g., if one or more operational parameter/condition thresholds has been exceeded). Data related to detected events (i.e., event data) may then be stored and/or transmitted to a remote location/server, as described in more detail below.

The event detection and reporting system 200 of FIG. 2 may include one or more devices or systems 214 for providing input data indicative of one or more operating parameters or one or more conditions of a commercial vehicle. Alternatively, the event detection and reporting system 200 may include a signal interface for receiving signals from the one or more devices or systems 214, which may be configured separate from system 200. For example, the devices 214 may be one or more sensors, such as but not limited to, one or more wheel speed sensors 216, one or more acceleration sensors such as multi-axis acceleration sensors 217, a steering angle sensor 218, a brake pressure sensor 219, one or more vehicle load sensors 220, a yaw rate sensor 221, a lane departure warning (LDW) sensor or system 222, one or more engine speed or condition sensors 223, and a tire pressure (TPMS) monitoring system 224. The event detection and reporting system 200 may also utilize additional devices or sensors in the exemplary embodiment including for example a forward distance sensor 260 and a rear distance sensor 262 (e.g., radar, lidar, etc.). Other sensors and/or actuators or power generation devices or combinations thereof may be used of otherwise provided as well, and one or more devices or sensors may be combined into a single unit as may be necessary and/or desired.

The event detection and reporting system 200 may also include brake light(s) 266 and/or notification device 264, and may be usable to provide headway time/safe following distance warnings, lane departure warnings, and warnings relating to braking and or obstacle avoidance events.

The event detection and reporting system 200 may also include a logic applying arrangement such as a controller or processor 230 and control logic 231, in communication with the one or more devices or systems 214. The processor 230 may include one or more inputs for receiving input data from the devices or systems 214. The processor 230 may be adapted to process the input data and compare the raw or processed input data to one or more stored threshold values or desired averages, or to process the input data and compare the raw or processed input data to one or more circumstance-dependent desired value.

The processor 230 may also include one or more outputs for delivering a control signal to one or more vehicle systems 233 based on the comparison. The control signal may instruct the systems 233 to provide one or more types of driver assistance warnings (e.g., warnings relating to braking and or obstacle avoidance events) and/or to intervene in the operation of the vehicle to initiate corrective action. For example, the processor 230 may generate and send the control signal to an engine electronic control unit or an actuating device to reduce the engine throttle 234 and slow the vehicle down. Further, the processor 230 may send the control signal to one or more vehicle brake systems 235, 236 to selectively engage the brakes (e.g., a differential braking operation). A variety of corrective actions may be possible and multiple corrective actions may be initiated at the same time.

The event detection and reporting system 200 may also include a memory portion 240 for storing and accessing system information, such as for example the system control logic 231. The memory portion 240, however, may be separate from the processor 230. The sensors 214 and processor 230 may be part of a preexisting system or use components of a preexisting system.

The event detection and reporting system 200 may also include a source of input data 242 indicative of a configuration/condition of a commercial vehicle. The processor 230 may sense or estimate the configuration/condition of the vehicle based on the input data, and may select a control tuning mode or sensitivity based on the vehicle configuration/condition. The processor 230 may compare the operational data received from the sensors or systems 214 to the information provided by the tuning.

In addition, the event detection and reporting system 200 is operatively coupled with one or more driver facing imaging devices, shown in the example embodiment for simplicity and ease of illustration as a single driver facing camera 245 that is trained on the driver and/or trained on the interior of the cab of the commercial vehicle. However, it should be appreciated that one or more physical video cameras may be disposed on the vehicle such as, for example, a video camera on each corner of the vehicle, one or more cameras mounted remotely and in operative communication with the event detection and reporting system 200 such as a forward facing camera 246 to record images of the roadway ahead of the vehicle. In the example embodiments, driver data can be collected directly using the driver facing camera 245 in accordance with a detected driver head positon, hand position, or the like, within the vehicle being operated by the vehicle. In addition, driver identity can be determined based on facial recognition technology and/or body/posture template matching.

Still yet further, the event detection and reporting system 200 may also include a transmitter/receiver (transceiver) module 250 such as, for example, a radio frequency (RF) transmitter including one or more antennas 252 for wireless communication of the automated control requests, GPS data, one or more various vehicle configuration and/or condition data, or the like between the vehicles and one or more destinations such as, for example, to one or more services (not shown) having a corresponding receiver and antenna. The transmitter/receiver (transceiver) module 250 may include various functional parts of sub portions operatively coupled with a platoon control unit including for example a communication receiver portion, a global position sensor (GPS) receiver portion, and a communication transmitter. For communication of specific information and/or data, the communication receiver and transmitter portions may include one or more functional and/or operational communication interface portions as well.

The processor 230 is operative to combine selected ones of the collected signals from the sensor systems described above into processed data representative of higher level vehicle condition data such as, for example, data from the multi-axis acceleration sensors 217 may be combined with the data from the steering angle sensor 218 to determine excessive curve speed event data. Other hybrid event data relatable to the vehicle and driver of the vehicle and obtainable from combining one or more selected raw data items from the sensors includes, for example and without limitation, excessive braking event data, excessive curve speed event data, lane departure warning event data, excessive lane departure event data, lane change without turn signal event data, loss of video tracking event data, LDW system disabled event data, distance alert event data, forward collision warning event data, haptic warning event data, collision mitigation braking event data, ATC event data, ESC event data, RSC event data, ABS event data, TPMS event data, engine system event data, average following distance event data, average fuel consumption event data, average ACC usage event data, and late speed adaptation (such as that given by signage or exiting).

The event detection and reporting system 200 of FIG. 2 is suitable for executing embodiments of one or more software systems or modules that perform vehicle brake strategies and vehicle braking control methods according to the subject application. The example event detection and reporting system 200 may include a bus or other communication mechanism for communicating information, and a processor 230 coupled with the bus for processing information. The computer system includes a main memory 240, such as random access memory (RAM) or other dynamic storage device for storing instructions and loaded portions of the trained neural network to be executed by the processor 230, and read only memory (ROM) or other static storage device for storing other static information and instructions for the processor 230. Other storage devices may also suitably be provided for storing information and instructions as necessary or desired.

Instructions may be read into the main memory 240 from another computer-readable medium, such as another storage device of via the transceiver 250. Execution of the sequences of instructions contained in main memory 240 causes the processor 230 to perform the process steps described herein. In an alternative implementation, hard-wired circuitry may be used in place of or in combination with software instructions to implement the invention. Thus implementations of the example embodiments are not limited to any specific combination of hardware circuitry and software.

Figure 3:
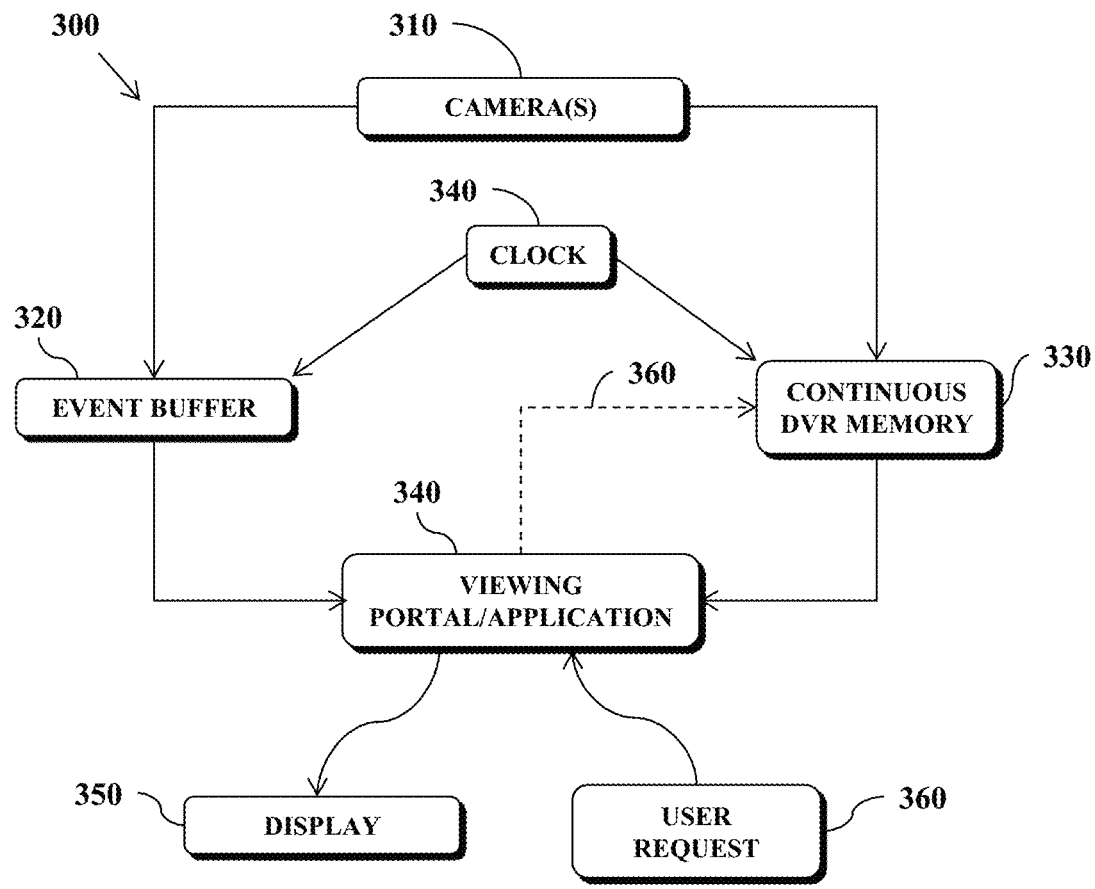
FIG. 3 depicts an arrangement, which comprises components of the vehicle-based computer system of FIG. 2, and which is configured to implement one or more aspects of the invention in the fleet management system of FIG. 1.

Referring now to FIG. 3, an arrangement 300 for implementing one or more aspects of the invention is shown. The arrangement 300 comprises one or more on-vehicle components from the previously-described event detection and reporting system 200, as well as certain off-vehicle components described below. For example, arrangement 300 includes one or more vehicle-mounted camera(s) 310 configured to capture vehicle video, as described above, including video from ahead of the vehicle (e.g., FFC 246), as well as to the side or to the rear of the vehicle. Video of the driver can also be captured using a driver facing camera (e.g., DFC 245).

In this embodiment, the camera(s) 310 provide video to two separate and distinct on-vehicle data memories; one being an event buffer 320 (which may contain video and data snippets relating to detected events) and the other being a continuous DVR memory 330.

With respect to the event buffer 320, it should be appreciated that the video snippets may comprise a sequence of video frames with separate but associated sensor data that has been collected from one or more on-vehicle sensors or devices, as detailed above, during a window of time in which a detected event occurred (e.g., 10 seconds before to 10 seconds after a detected event).

In the case of the continuous DVR memory, captured video frames and metadata are stored on a continuous basis, irrespective of whether an event has been detected or not. Video frames in the continuous DVR memory may include the same type of sensor data as that stored in the event buffer, but may instead be stored as metadata in frame headers, for example. Sensor data stored in the continuous DVR memory as metadata would preferably be associated with the frames of captured video that occurred at the same time as the sensor data was collected.

Both the video and data snippets and the continuous video may be timestamped based on a central or common clock 340 such that the data in the event buffer 320 and continuous DVR memory 330 can be cross-referenced using the timestamps. The benefit of cross referencing the data in the two memories is described further below.

Event data from the event buffer 320 may be transmitted by the on-vehicle event detection and reporting system to a remote server, such as server 140 of the above-described fleet management and reporting system 100. This transmission of event data may be done automatically in response to the occurrence of the detected event. Moreover, the automatic transmission of event data from the event buffer 320 may be based on one or more user-defined preferences, such as a particular type of detected event or the like.

Once the event data has been automatically transmitted from the on-vehicle event detection and reporting system to the remote server, the event data (including video snippet) may be provided to a user-side viewing portal or application 340. In certain embodiments, the viewing portal may comprise a web application provided on a user computer, such as the web application 142 described above. It should further be appreciated that the viewing portal or application may be a dedicated software program executing on a computer or mobile device that is accessible to the user. Regardless of how the data is made available to a user-side device, the user will be able to view event data on a user-side display 350. The user may be a fleet manager 160 or administrator 162, as described above.

Upon viewing the automatically downloaded event data snippet, the user may desire to obtain a more complete accounting of the detected event. This may be accomplished by submitting a prequel/sequel request 360, via the user-side viewing portal/application 340. This request 360, which may include an event identifier (e.g., time of event, event number, etc.), may then be relayed by the user-side viewing portal/application 340 to the on-vehicle event detection and reporting system and, in turn, to the continuous DVR memory 330, as shown in FIG. 3. In addition to including an event identifier, the request may specify how much prequel and how much sequel shall be sent. Alternatively, a user preference may be established for how much prequel and/or sequel data is to be provided in response to a user request such that the user does not need to separately specify a desired amount of additional data when making each such request. User preferences may also be established for automatic playback parameters, such as setting a preference to automatically play prequel video at 2× speed and sequel video at ½× speed, etc. Furthermore, if the DVR and event video are sampled at different frequencies, e.g. at 5 Hz and 12 Hz, we may create a combined, interleaved from the two memories, thereby more time resolved, event video. That is, some of the DVR frames may chronologically fit between the frames of the event video, and thereby make it more detailed.

In order for the request 360 to be properly processed, the on-vehicle event detection and reporting system cross-references the event data that was stored in the event buffer 320 and previously transmitted to the user with the video data stored in the continuous DVR memory 330. As noted above, this may be accomplished using an on-vehicle clock 340 to generate timestamps for the event data in buffer 320 that correspond to timestamps generated for the video stored in the continuous DVR memory 330.

It should be appreciated that a cross-referencing or association between the event data stored in buffer 320 and the continuous data stored in the DVR memory 330 is carried out because these are two unrelated memory areas storing two different types of video data—long term in a DVR memory and short term in a separate, specialized, event buffer. Moreover, separate data memories is useful for storing data in different formats, such as storing captured video frames separate from sensor data in the event buffer, while storing sensor data as video frame metadata in the continuous DVR memory, for example.

With respect to the manner in which the data in the two memories may be cross-referenced, or otherwise associated, in a first embodiment the video data in the continuous DVR memory 330 is associated to the event data in the event buffer 320 by their timestamps, which may come from clock 340, and which may be carried out on the viewing portal/application 340. Specifically, the clock 340 generates a plurality of timestamps which are applied to the continuous video data in the DVR memory 330, as well as to the corresponding portions of the event data in the buffer 320. Video data from the DVR memory may be conveniently divided into 1 minute segments, for example, from 11.15 to 11.16, from 11.16 to 11.17, and so on. If an event occurred at 11.05.43, for example, the user may request a full prequel, such as a two minute prequel (e.g., from 11.03-11.04, from 11.04 to 11.05 and from 11.05 to 11.06). The user may also request a one minute sequel, (e.g., 11.06 to 11.07). Of course, it should be appreciated that the DVR memory may be divided into smaller segments, for example, 10 second segments, or the like.

In a second embodiment, the event data stored in the event buffer 320 may be cross-referenced or associated to the video data in the DVR memory 330 by a process of embedding extra tags or bookmarks into the DVR video for corresponding detected events for which event data is stored in the buffer memory. The extra tags may be inserted at specific locations of the DVR video based on a correspondence between timestamps applied to the data in the event buffer 320 and timestamps applied to the continuous data in the DVR memory 330. These tags may correspond to a type of event (e.g., excessive braking) and define a period of time before and after the event, e.g., event time−2 minutes, event time−one minute, event time+one minute, etc. Given an event identifier, such as an event timestamp, a corresponding tag(s) in the DVR memory 330 may be located. Then, given a user set prequel and sequel length(s), the corresponding video data in the DVR memory may be identified and extracted for transmission to the requesting user via the viewing portal/application 340. It should further be appreciated that memory delta (e.g., go up and down by X bytes in memory to get Y many seconds earlier and or later) calculations may be performed on the vehicle, given the user request, to also arrive at the correct DVR data segment to be sent.

In a third embodiment, the event data stored in the event buffer 320 may be cross-referenced or associated to the video data in the DVR memory 330 by indexing a timestamp in the event buffer with a memory address or location at which the corresponding video data is stored in the DVR memory 330. This correspondence may be linear, i.e. the DVR data storage location pointer advances by e.g. 1.2 Mbyte per second, but other correlations are possible. Such indexing may be carried out using a lookup table stored in the DVR memory or preferably a separate memory, such as memory 240.

In a fourth embodiment, which is a variation on the third embodiment, it is possible to calculate, either on a server (e.g., server 140) or on the vehicle (e.g., processor 230), what DVR memory locations correspond to a given instant +/− the prequel and sequel lengths. This calculation establishes a zero point (e.g. at 12.34 am, when the system was started, we had the DVR memory pointer at 0xFEDCBA098), determines the memory location corresponding to the event time (e.g. xyz megabytes of data were stored since then up to the event time), and then carries out DVR memory delta calculations to arrive at prequel start/sequel end memory locations. These locations may then be used to identify and send additional event data requested by the user.

In a fifth embodiment, it is possible to log the DVR memory location at the instant an event occurred and send this DVR memory location with the automatically transmitted event data to a server (e.g., server 140). The server, with knowledge of the DVR data storage rate, may then perform memory delta calculations and allow the user to request a further desired segment from the DVR memory.

In a sixth embodiment, a more freeform, index-free, similarity-based, approach may be used in which contrast rich frames from the event video are used to locate the most similar corresponding video segment in the DVR memory, in corresponding frame order and with corresponding frame time separations.

One aspect of this embodiment is to use the recorded event metadata as a template to search metadata in the DVR memory in order to identify a section of best correspondence, while taking into account possibly different sampling rates and therefore using interpolation where needed. From there, memory delta calculations may be carried out with the results being transmitting to the user as the additional data requesting by the user. The use of metadata is possible because it is coeval with the video data.

In a seventh embodiment, the DVR memory locations and times and event types corresponding to the event data from the event buffer may be stored on the vehicle, although separately from the DVR memory. User requests for additional event data may then be compared to this separately-stored, on-vehicle DVR information, and used to locate the additional event data of interest in the DVR memory. The user may also transmit a batch request, e.g., request plural prequels and sequels to all events of a given type(s).

One additional approach for conserving time and resources that is consistent with the principles of the invention is to predefine, by the user, certain event types that will automatically initiate a download from the DVR memory of data corresponding to a detected event, but which may be in a condensed form, such as every 5th DVR frame or the like. Additional analysis on this automatically downloaded supplemental event data may also be performed and similarly presented to the user either automatically or upon request. The parameterization may apply to an on-vehicle analyzed version of the DVR video or metadata, for instance. For example, if a sufficiently large (value set by parameter) Standard Deviation of Lane Position is detected prior to a lane departure, the user may choose to automatically send this prequel rather than needing the user to request it. This on-vehicle data analysis, which may be performed by computationally efficient means such as recursive calculations, unburdens the user and provides additional event insight automatically. Another example is that of detecting low light, low contrast/visibility, low event frequency, 'featureless', 'nothing happening' video, particularly at night, which is tiring to drive in, and conducive to driver inattention/fatigue. User parameters may be used to set the light level, the contrast level, the hours of operation for this 'leading to fatigue' mode, etc.

In view of the above, it should be appreciated that a user may predefine parameters corresponding to a type of event for which supplemental event data is to be automatically transmitted, and/or ambient conditions under which supplemental event data is to be automatically transmitted. Additionally, a user may predefine parameters corresponding to a predefined amount of time before the point in time when the driving or vehicle event occurred to which the transmitted supplemental event data corresponds, and/or a reduced size in which the supplemental event data is to be transmitted. Alternatively, the automatically transmitted supplemental event data may be in the form of a notification that additional, related or unusual, behavior is available for a given event. In response to such a notification, the user may request to download the additional data.

Furthermore, an on-vehicle labeling operation may be carried out in which the supplemental event data to be transmitted is labeled with an indication of an event type to which the supplemental event data corresponds, and/or a degree to which the detected driving or vehicle event exceeded a corresponding threshold value.

Figure 4A:
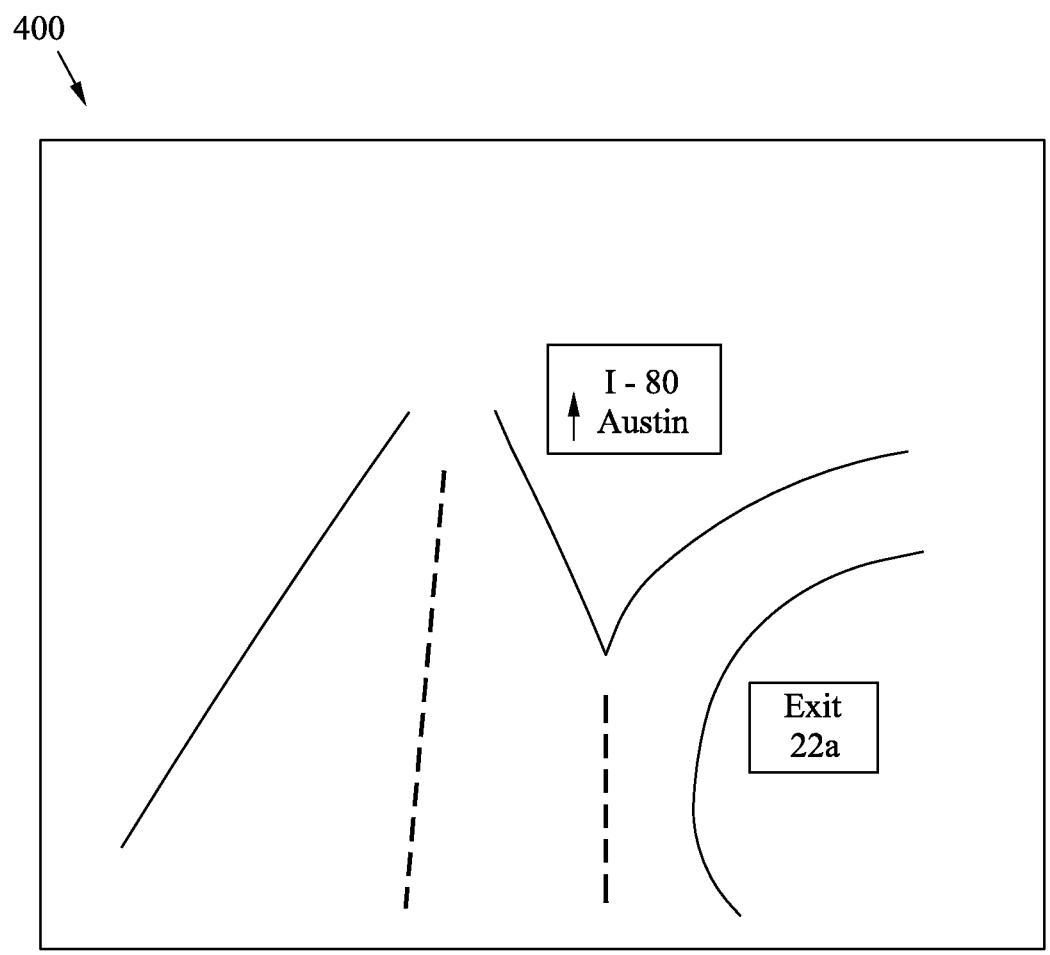
FIG. 4a illustrates an embodiment of a content-rich frame that may be captured and reduced in size to be used as the file icon.

In a further embodiment, a not-just-event centered search function may be provided which allows the user to request and retrieve video segments associated with particular times. For example, the user request 260 may request video segments spanning a specific period of time, e.g., from 14.13 to 14.15, or from 20.43 +/−2 minutes. These segments may be labeled or otherwise identifiable by the corresponding times, but may also be labeled/identified with an icon or symbol generated from a content rich frame of the segment. For example, FIG. 4a shows an example of such a content-rich frame 400 that may be captured and reduced in size to be used as the file icon, which may be displayed to the user via the viewing portal/application 340 described above. In this case, the file icon contains traffic signs which would indicate to the user the area in which the video was captured. The video processing required for identifying such frames may be done on the fly by a real-time sign reading function.

One objective of a file icon generated in accordance with the principles of the invention are to relay to the user the type of event, the magnitude of the event, and give a glimpse into what happened. To that end, one aspect of the file icons design is to use colors or shapes or directionality that convey the type of event that occurred, to use size or color saturation to show magnitude, and to optionally animate the graphic (e.g., gif file) with snapshots thereof to provide further insight into the event.

It should be appreciated that colors, shapes and/or directionality may be used to convey a particular type of event. For example, directionality of the icon may be used to convey a relative direction in which the event occurred, e.g., if an event happened on the right, then the shape should be right dominant, if the event occurred ahead, then the shape should be ahead dominant, etc. In one embodiment, the viewing portal/application 340 may allow the user to sort by icon shape, thereby effectively sorting events by the relative direction in which they occurred.

Figure 4B:
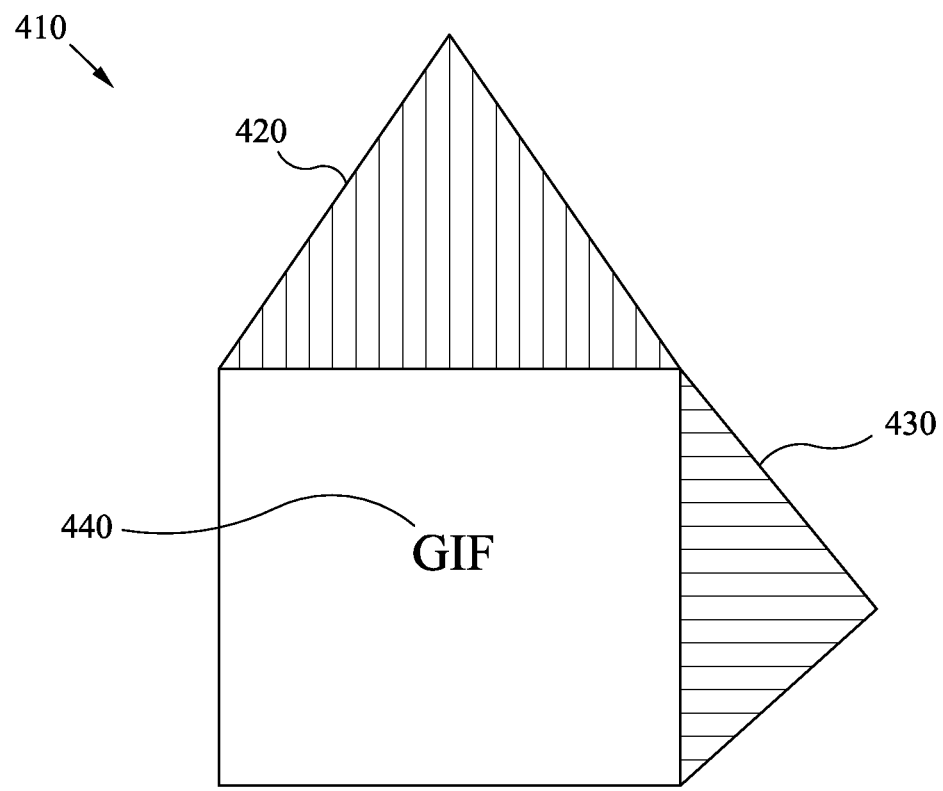
FIG. 4b illustrates an embodiment of a file icon generated from content-rich frame data.

FIG. 4b illustrates an embodiment of a file icon 410 generated from content-rich frame data in the form of a folded diamond shape in which one or more sides can be unfolded to convey directionality. Here an event forward (e.g. hard braking) and to the right (e.g., lane departure) occurred, and therefore an icon side representing the forward direction 420 and an icon side representing the right side direction 430 are shown as being 'unfolded.' Moreover, the degree of protrusion, intensity of the shaping, or coloring in each unfolded side 'leaf' may be used to indicate the average or maximum signal value (e.g. rate of lateral movement, deceleration, speed lost, etc.). The leaves may also be animated in accordance with the metadata values. Finally, within the center region 440 an animation can be used to show one or more event snapshots (e.g., animated gif images).

Additional icon conveyance of event information may include displaying a spinning icon for events in which the vehicle also spun, or tipping the icon to the left or right when the event involved a vehicle rolled. In short, icon behavior/animation may be used to reflect vehicle dynamic events.

In certain embodiments, the interior snapshots shown in the center region 440 may be chosen in one of several ways. For example, snapshots may be taken periodically, e.g., once a second, such that snapshots may be assigned to each second leading up to an event for a certain amount of sections (e.g., 5 seconds before an event). Alternatively, snapshots may correspond to that second of maximum signal value (e.g. that second (comprised of 5 frames, for example) of maximum deceleration or maximum lateral speed). Snapshots may also correspond to those frames of maximum image change (e.g., these may be derived from MPEG's differential image information). Finally, snapshots may correspond to those frames containing road relevant information, e.g. a traffic light, a stop sign, a guardrail, etc.

Regardless of the manner in which the snapshots are chosen, the result is to provide an informative, sortable, insight-giving icon for an event which is instantly discernible by the user without having to engage in any further interaction on the part of the user.

Figure 5:
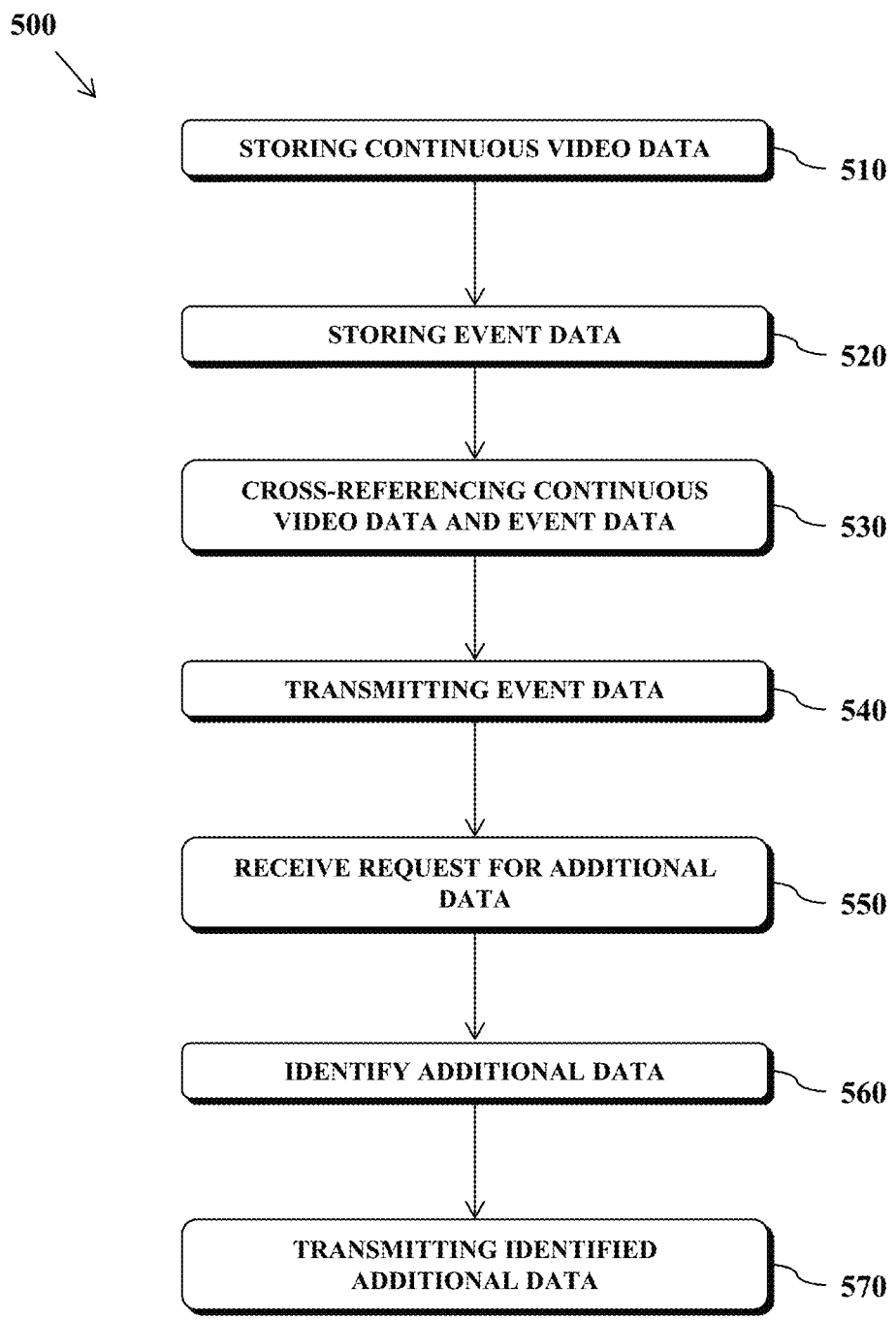
FIG. 5 illustrates a process for implementing one or more aspects of the invention.

Referring now to FIG. 5, depicted is a process for providing event data from cross-referenced data memories of an on-vehicle event detection and reporting system, in accordance with the principles of the invention. With respect to the above description, process 500 begins at block 510 by storing, in a digital video recorder (DVR) memory (e.g., DVR memory 330), continuous video data captured by an on-vehicle camera. At block 520, event data is stored in an event buffer (e.g., event buffer 320) in response to detecting a driving or vehicle event, where the event data comprises video data (and other metadata) corresponding to a point in time when the driving or vehicle event occurred. At block 530, the method includes cross-referencing the event data in the event buffer with the continuous video data stored in the DVR memory. The event data stored in the event buffer may then be transmitted, via an on-vehicle wireless transceiver, to a remote server (e.g., server 140) in response to detecting the driving or vehicle event for display on a user computer (block 540).

Continuing to refer to FIG. 5, the process 500 continues, at block 550, by receiving, from the remote server via the wireless transceiver, a user request for additional data (video data and/or metadata) corresponding to the detected driving or vehicle event, where the request includes an event identifier corresponding to the detected driving or vehicle event. At block 560, the process further includes identifying the additional data in the DVR memory using the event identifier and based on said cross-referencing between the event data with the continuous video data stored in the DVR memory. Finally, process 500 includes transmitting, via the transceiver to the remote server, the identified additional data from the DVR memory for display on the user computer (block 570).

As used herein, the terms "a" or "an" shall mean one or more than one. The term "plurality" shall mean two or more than two. The term "another" is defined as a second or more. The terms "including" and/or "having" are open ended (e.g., comprising). The term "or" as used herein is to be interpreted as inclusive or meaning any one or any combination. Therefore, "A, B or C" means "any of the following: A; B;

C; A and B; A and C; B and C; A, B and C". An exception to this definition will occur only when a combination of elements, functions, steps or acts are in some way inherently mutually exclusive.

Reference throughout this document to "one embodiment", "certain embodiments", "an embodiment" or similar term means that a particular feature, structure, or characteristic described in connection with the embodiment is included in at least one embodiment of the present invention. Thus, the appearances of such phrases or in various places throughout this specification are not necessarily all referring to the same embodiment. Furthermore, the particular features, structures, or characteristics may be combined in any suitable manner on one or more embodiments without limitation.

In accordance with the practices of persons skilled in the art of computer programming, the invention is described below with reference to operations that are performed by a computer system or a like electronic system. Such operations are sometimes referred to as being computer-executed. It will be appreciated that operations that are symbolically represented include the manipulation by a processor, such as a central processing unit, of electrical signals representing data bits and the maintenance of data bits at memory locations, such as in system memory, as well as other processing of signals. The memory locations where data bits are maintained are physical locations that have particular electrical, magnetic, optical, or organic properties corresponding to the data bits.

The term "server" means a functionally-related group of electrical components, such as a computer system that may or may not be connected to a network and which may include both hardware and software components, or alternatively only the software components that, when executed, carry out certain functions. The "server" may be further integrated with a database management system and one or more associated databases.

In accordance with the descriptions herein, the term "computer readable medium," as used herein, refers to any non-transitory media that participates in providing instructions to the processor 230 for execution. Such a non-transitory medium may take many forms, including but not limited to volatile and non-volatile media. Non-volatile media includes, for example, optical or magnetic disks. Volatile media includes dynamic memory for example and does not include transitory signals, carrier waves, or the like. Common forms of computer-readable media include, for example, a floppy disk, a flexible disk, hard disk, magnetic tape, or any other magnetic medium, a CD-ROM, any other optical medium, any other physical medium with patterns of holes, a RAM, PROM, and EPROM, a FLASH-EPROM, any other memory chip or cartridge, or any other tangible non-transitory medium from which a computer can read.

In addition and further in accordance with the descriptions herein, the term "logic," as used herein, with respect to FIG. 2, includes hardware, firmware, software in execution on a machine, and/or combinations of each to perform a function (s) or an action(s), and/or to cause a function or action from another logic, method, and/or system. Logic may include a software controlled microprocessor, a discrete logic (e.g., ASIC), an analog circuit, a digital circuit, a programmed logic device, a memory device containing instructions, and so on. Logic may include one or more gates, combinations of gates, or other circuit components.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. An on-vehicle event detection and reporting system comprising:
    a camera;
    an event buffer,
    a continuous digital video recorder (DVR) memory;
    a clock circuit;
    a wireless transceiver;
    a processor, coupled to the camera, event buffer, DVR memory, clock circuit and wireless transceiver, wherein the processor is configured to:
        store continuous video data received from the camera in the DVR memory,
        store event data, separately received from the camera, in the event buffer, in response to detecting a driving or vehicle event, wherein the event data comprises video data corresponding to a point in time when the driving or vehicle event occurred,
        cross-reference the event data with the continuous video data stored in the DVR memory,
        transmit, via the wireless transceiver to a remote server, the event data stored in the event buffer in response to detecting the driving or vehicle event, wherein at least a portion of the event data is configured to be displayed on a user computer,
        receive, from the remote server via the wireless transceiver in response to transmitting the event data to the remote server, a request for additional data corresponding to the detected driving or vehicle event, wherein the request includes an event identifier corresponding to the detected driving or vehicle event, and the additional data comprises video data before and/or after the event data, and wherein the additional data is automatically requested by the remote server when the detected driver or vehicle event is of a predefined type,
        identify the additional data in the DVR memory using the event identifier and the cross-reference between the event data with the continuous video data stored in the DVR memory, and
        transmit, via the transceiver to the remote server, the identified additional data from the DVR memory, wherein the additional data is configured to be displayed on the user computer.

2. The system of claim 1, wherein the event data comprises a video snippet captured by the camera beginning from a predefined amount of time before the point in time when the driving or vehicle event occurred and ending at a predefined amount of time after the point in time when the driving or vehicle event occurred.

3. The system of claim 2, wherein the event data further comprises non-video data captured by one or more vehicle sensors relating to the driving or vehicle event.

4. The system of claim 1, wherein the processor is configured to cross-reference the event data with the continuous video data stored in the DVR memory by:
    generating a plurality of timestamps, using the clock circuit, and
    applying the plurality of timestamps to the continuous video data in the DVR memory and to corresponding portions of the event data in the event buffer.

5. The system of claim 1, wherein the processor is configured to cross-reference the event data with the continuous video data stored in the DVR memory by embedding a plurality of tags into the continuous video data in the DVR which correspond to detected events for which event data is stored in the event buffer.

6. The system of claim 5, wherein the plurality of tags are embedded at locations of the continuous video data based on a correspondence between timestamps applied to data in the event buffer and timestamps applied to the continuous data in the DVR memory, where the timestamps are generated by the clock circuit.

7. The system of claim 1, wherein the processor is configured to cross-reference the event data with the continuous video data stored in the DVR memory by indexing one or more timestamps in the event buffer with one or more corresponding memory locations at which corresponding data is stored in the DVR memory.

8. The system of claim 1, wherein the processor is configured to cross-reference the event data with the continuous video data stored in the DVR memory by one of:
   calculating a memory delta as a function of time from a zero point of the continuous video data in the DVR memory to the point in time when the driving or vehicle event occurred, wherein the memory delta corresponds to a memory location at which the additional data is stored in the DVR memory,
   logging a memory location in the DVR memory at the point in when the driving or vehicle event occurred, and transmitting this memory location with the event data stored in the event buffer in response to detecting the driving or vehicle event,
   matching an imagery segment from the event data with a corresponding segment in the continuous video data stored in the DVR memory, or
   storing, in a separate memory of the vehicle apart from the DVR memory and the event buffer, one or more of locations, times and event types corresponding to the event data, wherein user requests for additional data are compared to at least part of the one or more of locations, times and event types stored in the separate memory to identify a location of the additional data in the DVR memory.

9. The system of claim 1, wherein the event data stored in the event buffer is transmitted, via the wireless transceiver, in response to detecting the driving or vehicle event.

10. The system of claim 1, wherein the processor is further to receive a further request, from the remote server via the wireless transceiver, for a video segment corresponding to a defined period of time, and wherein a content-rich frame within said video segment is used to generate a file icon for said video segment.

11. The system of claim 1, wherein the processor is configured to transmit the identified additional data by transmitting a reduced size version of the identified additional data.

12. The system of claim 1, wherein the processor is further configured to automatically transmit, prior to receiving the request for the additional data, supplemental event data from the DVR memory in accordance with one or more predefined user parameters.

13. The system of claim 12, wherein the one or more predefined user parameters correspond to one or more of the following:
   a type of event for which supplemental event data is to be automatically transmitted,
   ambient conditions under which supplemental event data is to be automatically transmitted.

14. The system of claim 12, wherein the one or more predefined user parameters correspond to one or more of the following:
   a predefined amount of time before the point in time when the driving or vehicle event occurred to which the transmitted supplemental event data corresponds,
   a reduced size in which the supplemental event data is to be transmitted.

15. The system of claim 12, wherein the processor is further configured to label the supplemental event data with an indication of one or more of:
   an event type to which the supplemental event data corresponds,
   a degree to which the detected driving or vehicle event exceeded a corresponding threshold value.

16. A method for providing event data from cross-referenced data memories of an on-vehicle event detection and reporting system, the method comprising:
   storing, in a digital video recorder (DVR) memory of the system, continuous video data captured by an on-vehicle camera;
   storing event data, separately captured by the on-vehicle camera, in an event buffer of the system in response to detecting a driving or vehicle event, wherein the event data comprises video data corresponding to a point in time when the driving or vehicle event occurred;
   cross-referencing the event data in the event buffer with the continuous video data stored in the DVR memory,
   transmitting, via a wireless transceiver of the system to a remote server, the event data stored in the event buffer in response to detecting the driving or vehicle event for display on a user computer;
   receiving, from the remote server via the wireless transceiver in response to transmitting the event data to the remote server, a request for additional data corresponding to the detected driving or vehicle event, wherein the request includes an event identifier corresponding to the detected driving or vehicle event, and the additional data comprises video data before and/or after the event data, and wherein the additional data is automatically requested by the remote server when the detected driver or vehicle event is of a predefined type;
   identifying the additional data in the DVR memory using the event identifier and based on said cross-referencing between the event data with the continuous video data stored in the DVR memory;
   transmitting, via the transceiver to the remote server, the identified additional data from the DVR memory for display on the user computer.

17. The method of claim 16, wherein the event data comprises a video snippet captured by the camera beginning from a predefined amount of time before the point in time when the driving or vehicle event occurred and ending at a predefined amount of time after the point in time when the driving or vehicle event occurred.

18. The method of claim 17, wherein the event data further comprises non-video data captured by one or more vehicle sensors relating to the driving or vehicle event.

19. The method of claim 16, wherein cross-referencing the event data with the continuous video data stored in the DVR memory comprises:
   generating a plurality of timestamps, using a clock circuit of the system; and
   applying the plurality of timestamps to the continuous video data in the DVR memory and to corresponding portions of the event data in the event buffer.

20. The method of claim 16, wherein cross-referencing the event data with the continuous video data stored in the DVR memory comprises embedding a plurality of tags into the continuous video data in the DVR which correspond to detected events for which event data is stored in the event buffer.

21. The method of claim 20, wherein the plurality of tags are embedded at locations of the continuous video data based on a correspondence between timestamps applied to data in the event buffer and timestamps applied to the continuous data in the DVR memory, where the timestamps are generated by a clock circuit of the system.

22. The method of claim 16, wherein cross-referencing the event data with the continuous video data stored in the DVR memory comprises indexing one or more timestamps in the event buffer with one or more corresponding memory locations at which corresponding data is stored in the DVR memory.

23. The method of claim 16, wherein cross-referencing the event data with the continuous video data stored in the DVR memory comprises one of the following acts:
  calculating a memory delta as a function of time from a zero point of the continuous video data in the DVR memory to the point in time when the driving or vehicle event occurred, wherein the memory delta corresponds to a memory location at which the additional data is stored in the DVR memory,
  logging a memory location in the DVR memory at the point in when the driving or vehicle event occurred, and transmitting this memory location with the event data stored in the event buffer in response to detecting the driving or vehicle event,
  matching an imagery segment from the event data with a corresponding segment in the continuous video data stored in the DVR memory, or
  storing, in a separate memory of the vehicle apart from the DVR memory and the event buffer, one or more of locations, times and event types corresponding to the event data, wherein user requests for additional data are compared to at least part of the one or more of locations, times and event types stored in the separate memory to identify a location of the additional data in the DVR memory.

24. The method of claim 16, wherein transmitting the event data comprises transmitting, via the wireless transceiver, the event data in response to detecting the driving or vehicle event.

25. The method of claim 16, further comprising receiving a further request, from the remote server via the wireless transceiver, for a video segment corresponding to a defined period of time, and wherein at least one content-rich frame within said video segment and/or corresponding metadata is used to generate a file icon for said video segment.

26. The method of claim 16, wherein transmitting the identified additional data comprising transmitting a reduced size version of the identified additional data.

27. The method of claim 16, further comprising automatically transmitting, prior to receiving the request for the additional data, supplemental event data from the DVR memory in accordance with one or more predefined user parameters.

28. The method of claim 27, wherein the one or more predefined user parameters correspond to one or more of the following:
  a type of event for which supplemental event data is to be automatically transmitted,
  ambient conditions under which supplemental event data is to be automatically transmitted.

29. The method of claim 27, wherein the one or more predefined user parameters correspond to one or more of the following:
  a predefined amount of time before the point in time when the driving or vehicle event occurred to which the transmitted supplemental event data corresponds,
  a reduced size in which the supplemental event data is to be transmitted.

30. The method of claim 27, further comprising labeling the supplemental event data with an indication of one or more of:
  an event type to which the supplemental event data corresponds,
  a degree to which the detected driving or vehicle event exceeded a corresponding threshold value.

* * * * *